UNITED STATES PATENT OFFICE.

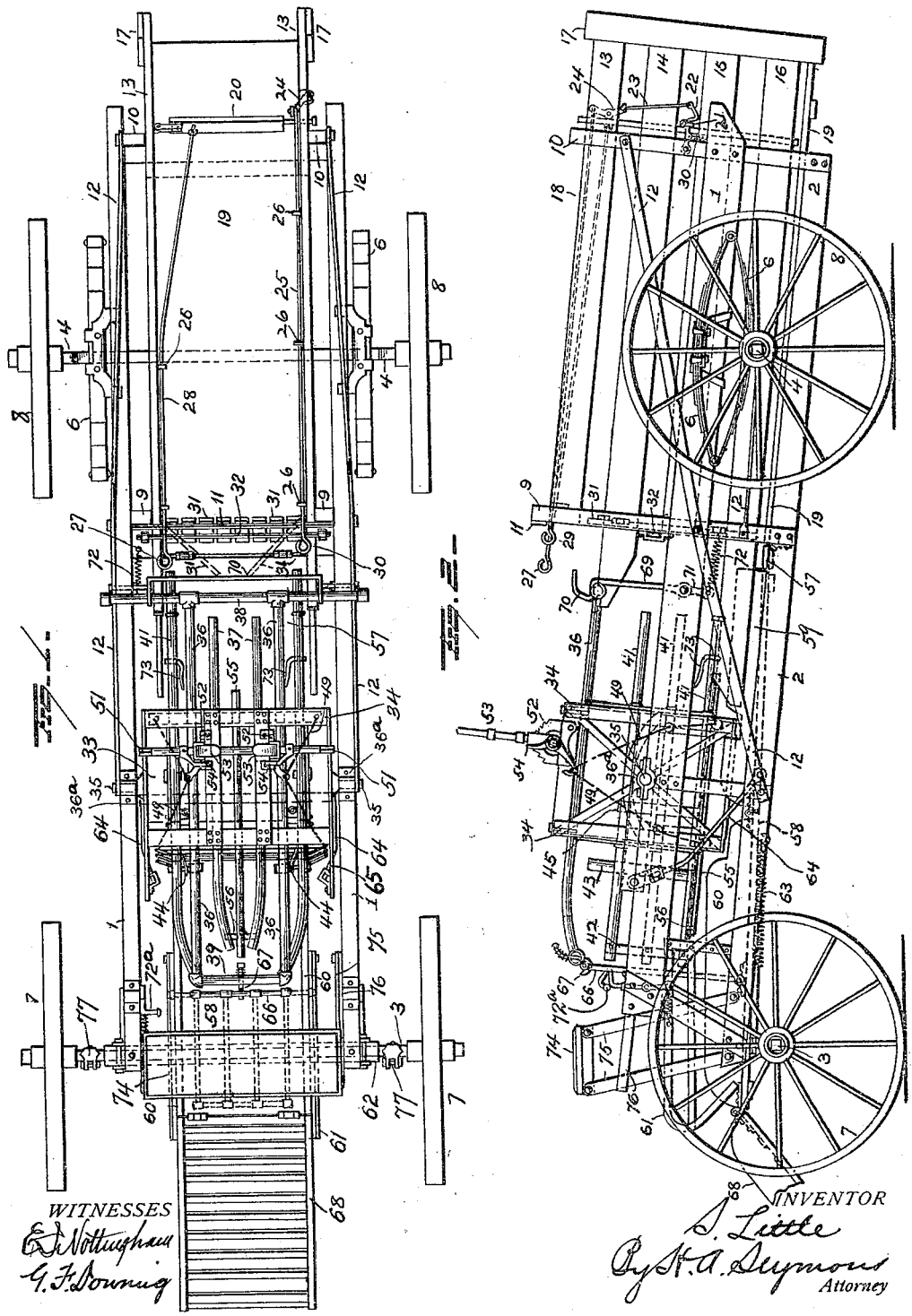

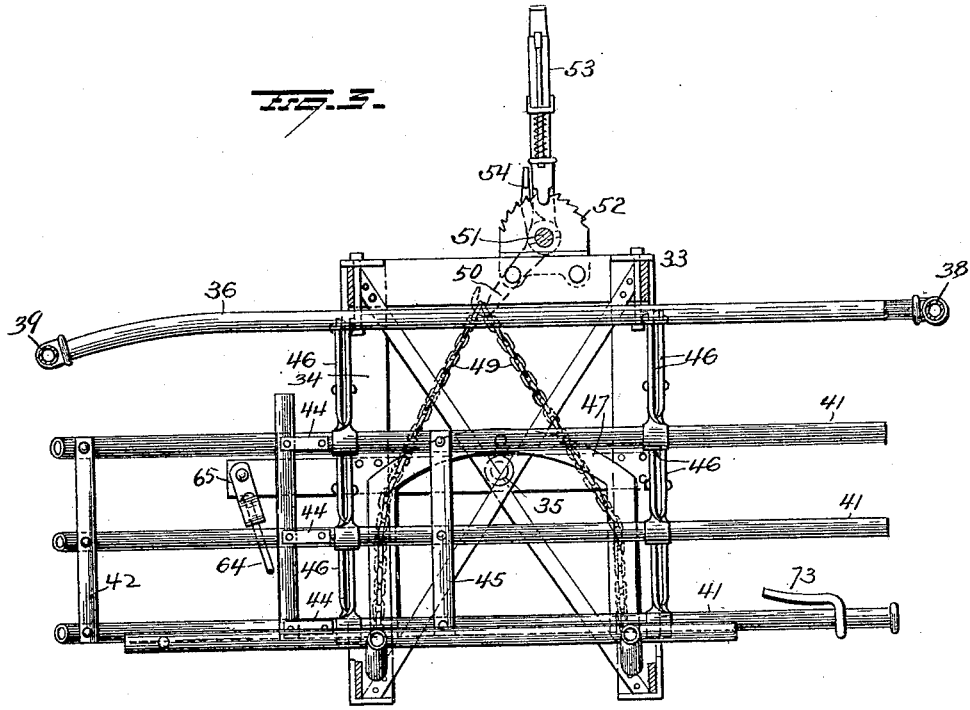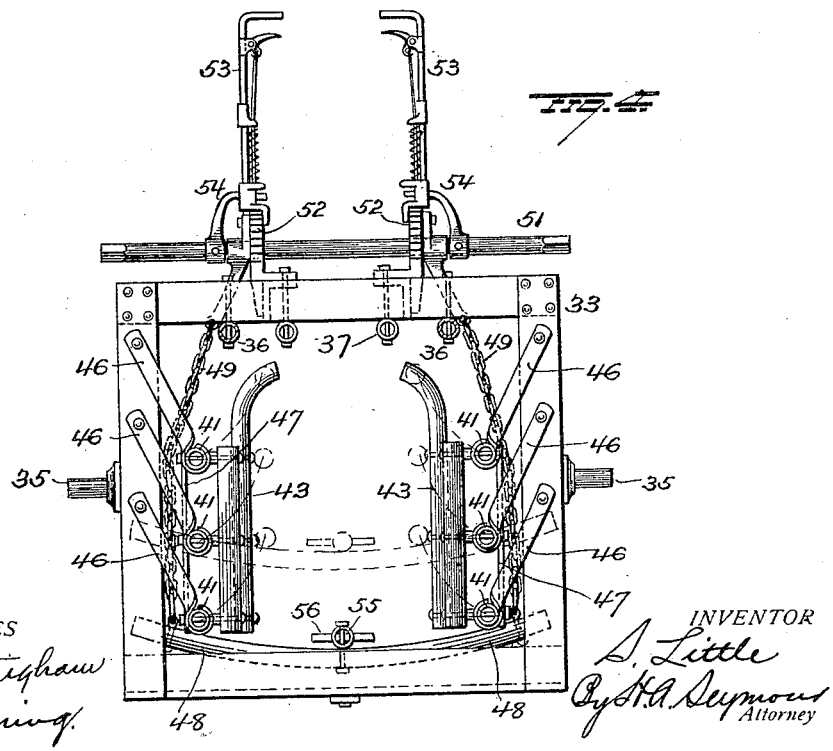

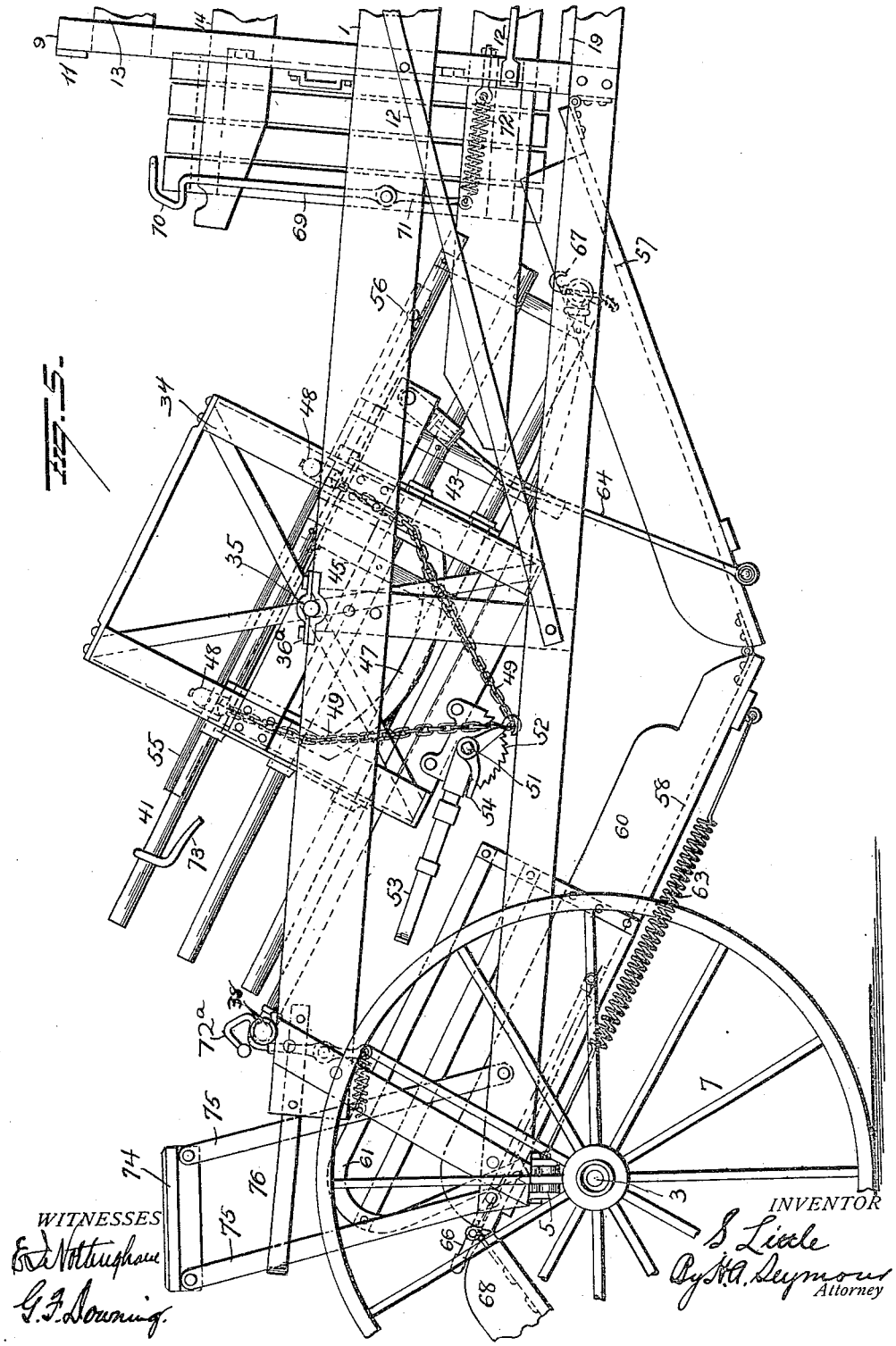

SANTFORD LITTLE, OF FAIRMOUNT, INDIANA.

MACHINE FOR HOLDING ANIMALS.

1,136,429.

Specification of Letters Patent. Patented Apr. 20, 1915.

Application filed March 13, 1914. Serial No. 824,433.

*To all whom it may concern:*

Be it known that I, SANTFORD LITTLE, of Fairmount, in the county of Grant and State of Indiana, have invented certain new and useful Improvements in Machines for Holding Animals; and I do hereby declare the following to be a full, clear, and exact description of the invention, such as will enable others skilled in the art to which it appertains to make and use the same.

This invention relates to improvements in machines for holding animals while under treatment, and more particularly to an improved hog holding machine, the object of the invention being to so construct a machine of the class mentioned, that the animal may be readily caught, and held in proper and convenient position to be operated upon, without scaring, worrying or otherwise injuring such animal, and with perfect safety to the operator and his assistants.

A further object is to provide a machine which may be readily operated to turn the animal to a position most convenient to the operator, for performing a particular operation upon such animal, and so that the animal may be readily placed upon his feet after the operation has been performed, and permitted to leave the machine.

With these and other objects in view, the invention consists in certain novel features of construction and combinations of parts as hereinafter set forth and pointed out in the claims.

In the accompanying drawings; Figure 1 is a plan view of a machine embodying my improvements; Fig. 2 is a side elevation of the same, partly broken away; Fig. 3 is a sectional view of the holding cage, removed, Fig. 4 is an end view of said cage, and Fig. 5 is a side elevation showing positions of the parts when the holding cage is inverted.

The frame of the machine comprises side timbers 1, 2, with which axles 3—4 are connected through the medium of springs 5—6, and said axles are made with suitable spindles mounted in the hubs of carrying wheels 7—8. Uprights 9, 10 are secured to each pair of side timbers 1, 2 and the forward pair 9 of these uprights are connected by a cross bar 11, suitable braces 12 being connected with the rear uprights and side timbers of the wheeled frame. Rails 13, 14, 15 and 16 are secured to the uprights 9—10 at each side of the wheeled frame, said rails being made to project rearwardly beyond the uprights 10 and connected by upright bars 17. This structure forms a pen 18 to receive the hog, and is provided with a floor 19. Near its rear end, the pen 18 is provided with a door 20, hinged at one vertical edge to two or more of the rails at one side of the pen, and provided at its free edge with a keeper 21 to receive a latch 22. This latch is pivoted to one of the uprights 10 and its free end is connected, by means of a rod 23, with one arm of a bell-crank lever 24,—the latter being pivotally mounted on the upper rail 13 at one side of the pen. A rod 25 is attached to the upper arm of the bell-crank 24 and after passing through suitable guides 26 on said upper rail 13, projects beyond the forward end of the pen, where it is provided with a suitable hand-hold 27. It will be observed that the uprights 10 and the door 20 are slightly inclined rearwardly, so that when the latch is raised by manipulation of the rod 25 from the front end of the pen, the door will swing open by gravity. For the purpose of permitting the operator to close the door from the front end of the pen, a rod 28 is attached at one end to the door and extends beyond the front end of the pen, where it is provided with a hand-hold 29. When the door is closed by manipulation of the rod 28, the latch 22 will ride over the keeper 21 and a spring 30 will cause engagement of the latch with the keeper,— the connection of the rod 23 with the bell-crank 24 being such as to permit sufficient sliding movement of the rod relatively to the bell-crank, to allow the latch to ride over and engage the keeper.

At the front end of the pen, double doors 31 are provided, and a cross bar 32 is employed to retain these doors normally closed. When the cross bar 32 has been removed, the hog can pass forwardly out of the pen, said doors swinging open and forming side guards to direct the hog to a holding and turning cage 33 in the forward portion of the wheeled frame.

In constructing the cage 33, I provide a central rectangular frame 34, provided centrally with trunnions 35, for which mountings 36ª are provided on the side timbers 1 of the wheeled frame. The top bars 36 and 37 (two of each being shown in the drawing) of the holding cage, are secured under the top members of the central, rectangular frame 34 and project at both ends beyond said frame. The top bars 36 extend rearwardly beyond the rear ends of the bars 37 and are connected by a cross bar 38, the ends of which project laterally beyond the connection of said cross bar with the bars 36. The cross bar 38 constitutes a handle by means of which the holding cage may be operated, as hereinafter explained. The forward ends of the top bars 36 are slightly curved downwardly and connected by a cross bar 39, and the forward ends of the bars 37 are also slightly curved downwardly.

At respective sides of the vertical center line of the rectangular frame 34, pluralities of horizontal clamp bars 41—41 are located, said clamp bars projecting in both directions beyond said frame and curved inwardly somewhat at their forward ends. Near their forward ends, the bars 41 of each set are connected by vertical braces 42, and rearwardly of the forward ends of said bars, upright bars 43 are secured thereto and the upper ends of said bars 43, (which project above the upper clamp bar of each set) is curved inwardly,—said bars 43 being adapted to engage the hog just back of the jowls and to insure the stability of said bars 43, braces 44 may be employed. Other vertical clamp bars 45 are secured to the horizontal clamp bars 41, to engage the hog behind the shoulders. The horizontal clamp bars and the vertical clamp bars secured thereto are sustained by links 46, the upper ends of which are pivotally attached to side bars of the central frame 34 and the lower ends of said links are loosely connected with the horizontal clamp bars 41. In order to brace the clamp bars, an inverted U-shaped frame 47 may be secured to each set of clamp bars 41,—the cross member of said frame being secured to the upper bar 41 and the leg portions of said frame being secured to the lower bars 41.

Two curved rails 48 are transversely disposed under the two sets of clamp bars and the end portions of these rails are connected, by means of chains 49, with hooked arms 50, the upper ends of which are made with hubs mounted on a shaft 51. Toothed segments 52 are secured upon the frame 33 and provided with bearings for the accommodation of the shaft 51. Levers 53 are rigidly secured to the hubs of the hooked arms 50 and provided with suitable detents to engage the toothed segments 52. It is apparent that when the levers 53 are moved in one direction, the clamp bars will be raised and caused to move toward each other to grasp the hog. The ends of the shaft 51 may be made angular for the reception of a hand lever for turning the shaft, and said shaft may be provided with fixed arms 54 to engage the levers 53 when the shaft is turned and thus the clamp devices may be operated by turning the shaft with the use of a lever at either end of the latter.

Located centrally between the base portions of the two sets of clamp bars, and secured upon the curved rails 48, is a longitudinal bar 55 provided at its forward end with a cross head 56, and when the rails 48 are raised to operate the clamp bars, the longitudinal bar 55 will be raised also for a purpose hereinafter explained.

Under the clamping and turning cage above described, floor sections 57 and 58 are located and provided with guards 59—60 and guards 61 are secured to the forward portions of the guards 60 and project upwardly therefrom. The floor sections 57—58 are hinged together and the section 57 is hinged to the forward portion of the pen 18, while the forward portion of the floor section 58 is movable over a plate 62 on the forward axle. A spring 63 is connected with the floor section and with the forward axle or the plate 59 thereon. The floor section 56 is connected by means of rods or pitmen 64 with arms 65 projecting forward from the frame 34 of the clamping cage 33. A gate 66 is located in advance of the clamping cage 33 and is hinged at its bottom to the wheeled frame or to the forward portion of the floor section 58. This gate is normally held in a vertical position by means of yielding latch hook 67 carried by the cross bar 39 at the forward ends of the bars 36. At the forward end of the wheeled frame, a chute 68 is provided to facilitate the ready exit of the hog from the machine.

Between the pen 18 and the clamping cage 33, a latch device 69 is pivotally supported by the timbers 1 of the wheeled frame, said latch device being formed with shouldered portions 70 to engage the rear cross-bar or handle 38 of the cage 33,—said latch device being also provided with a depending arm 71. A spring 72 attached at one end to the framework and at the other end to the arm 71, serves to cause the latch device to properly engage the cross bar 38 of the cage to hold the latter in normal horizontal position. When the clamping cage is turned to the position shown in Fig. 5, it will be held in such position by the operation of a spring actuated latch 72$^a$ located near the forward end of the machine. The lower clamp bars 41 of the cage may be provided with slidable clamps 73 to engage the hind legs of the hog.

When the hog shall have entered the pen 18 as previously explained, he will be caused to move forwardly through the double doors 31 and enter the clamping cage 33 and stand upon the floor sections 57—58. After his hind legs shall have been secured by means of the clamps 73, the operator will operate the levers 53 (on the shaft 51) to actuate the clamping bars to grasp the hog as previously explained. When the clamping bars are thus operated, the central longitudinal bar will be elevated and caused to raise the hog off the floor 57—58. The hog is now firmly held in the clamping cage and may be treated without danger to the operator or loss of medicine during such treatment. The operator may now release the cage from the latch devices 69—70 and turn said cage to the position shown in Fig. 5,—in which position it will be held by the latch 72. The hog is now held in suitable position to be operated upon, without danger of undue injury to him or to the operator.

When the cage is turned or partially rotated as above described, the forward gate 66 will be released from the hook latch 67 and will fall upon the floor section 58. During such turning of the cage, motion will be imparted to the floor sections by the rods 64, and said floor sections caused to drop to the positions shown in Fig. 5,—in which position it will be held by the latch 72. The hog is now held in suitable position to be operated upon, without danger of undue injury to him or to the operator.

When the cage is turned or partially rotated as above described, the forward gate 66 will be released from the hook latch 67 and will fall upon the floor section 58. During such turning of the cage, motion will be imparted to the floor sections by the rods 64, and said floor sections caused to drop to the positions shown in dotted lines in Fig. 2, in which position, they will form a trough and facilitate proper drainage for the machine.

After the operation on the hog shall have been completed, the operator will turn the cage to its normal horizontal position. This will cause the floor sections to assume their normal position (being assisted in returning to such position by the action of the spring 63) and, after the hog has been released from the clamping devices, he will be standing upon the floor sections 57—58 and will be free to leave the forward end of the machine.

A driver's seat 74 is provided at the forward end of the machine, and supported by uprights 75 pivotally attached thereto and pivoted at their lower ends to the framework. The seat is held in its normal position by means of arms 76 which engage the forward uprights 75. In this manner a folding seat is provided which may also be used as an operator's equipment table. Clips 77 are secured to the front axle and provide means for the attachment of suitable draft devices.

Numerous slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a machine of the character described, the combination with a pivotally mounted frame, of two sets of connected bars passing through said frame, inclined links independently suspending the respective sets of connected bars from the sides of said frame, a transverse rail disposed under said sets of bars, and means for raising said transverse rail to actuate said sets of bars and clamp an animal between them.

2. In a machine of the character described, the combination with a frame, of a floor, a cage mounted in said frame, said cage comprising two sets of clamping bars, an animal raising bar, and means for operating said raising bar to raise an animal off the floor and for operating said sets of clamping bars to clamp the body of the animal between them.

3. In a machine of the character described, the combination with a centrally pivoted frame, of two sets of bars movable in said frame, each set of bars comprising a plurality of horizontal bars and a plurality of vertical bars connecting the horizontal bars, said vertical bars being curved inwardly at their upper ends and the vertical bars of one set separated from the vertical bars of the other set at the upper ends of the same, sets of links suspending the sets of bars from the pivoted frame, a transverse rail under the sets of bars and adapted to movably engage the lower horizontal bar of each set, and means for raising said transverse rail.

4. In a machine of the character described, the combination with a frame, of a cage mounted therein, said cage comprising oppositely disposed clamping bars, means movably supporting said clamping bars, curved rails transversely disposed under said bars, operating levers and flexible connections between said levers and curved rails for operating the latter to clamp an animal between said oppositely disposed clamping bars.

5. In a machine of the character described, the combination with a frame, and a floor therein, of a cage revolubly mounted in said frame, said cage comprising clamping means for the body of a hog, a central longitudinal bar for raising an animal off the floor, curved rails transversely under the clamping means and longitudinal raising bar, and means for raising said rails to raise the longitudinal bar and operate the clamping means.

6. In a machine of the character described, the combination with a frame, and a floor comprising hinged sections, of a revoluble holding cage mounted in said frame, connections between said cage and the floor sections for dropping the latter when the cage is turned in one direction, and for raising said floor sections when the cage is returned to horizontal position.

7. In a machine of the character described, the combination with a frame, and a floor therein comprising drop floor sections, of a revoluble holding cage mounted in said frame, pitman connections between said cage and floor sections for operating the latter, and a spring connected with said floor sections and the frame for assisting the return of said floor sections to normal position.

8. In a machine of the character described, the combination with a frame, of a holding cage comprising two sets of oppositely disposed clamping bars, frames rigidly connecting the bars of each set, a plurality of inclined links suspending each set of bars from said frame, and rails under the two sets of clamping bars, and means for raising said rails to raise the sets of bars to clamp the body of an animal between them.

9. In a machine of the character described, the combination with a main frame, of a holding cage comprising a central rectangular frame, top bars secured to said central frame and projecting in opposite directions therefrom and two sets of oppositely disposed clamping bars projecting beyond said central frame, inclined links attached at their upper ends to the central frame and pivotally connected at their lower ends to said sets of clamping bars, curved rails transversely under said sets of bars, and means for raising said rails to raise the sets of clamping bars and clamp the body of an animal between them.

10. In a machine of the character described, the combination with a frame, of a revoluble holding cage mounted therein, a gate in advance of said cage, and a latch device mounted on the cage for normally holding the gate in position, said latch being movable with the cage away from the gate to release the latter and permit it to drop when the cage is turned.

11. In a machine of the character described, the combination with a main frame, of a pen located on said frame, an entrance gate for said pen, means for releasing said gate, a holding cage mounted on said main frame to turn and located in advance of said pen, gates at the forward end of said pen and adapted when open to form an alleyway between the pen and the cage, and a drop gate mounted on the main frame in advance of the cage and normally held closed by the latter.

In testimony whereof, I have signed this specification in the presence of two subscribing witnesses.

SANTFORD LITTLE.

Witnesses:
EDWIN M. YORK,
A. H. UNTHANK.

Copies of this patent may be obtained for five cents each, by addressing the "Commissioner of Patents, Washington, D. C."